United States Patent [19]
Kleinwaechter

[11] 3,796,898
[45] Mar. 12, 1974

[54] MAGNETIC TYPE TRANSMISSION ARRANGEMENT

[76] Inventor: Hans Kleinwaechter, Kreuzstrasse 105, Loerrach, Germany

[22] Filed: Aug. 31, 1972

[21] Appl. No.: 285,518

[30] Foreign Application Priority Data
Sept. 1, 1971 Germany.............................. 2143662

[52] U.S. Cl.................................. 310/103, 74/640
[51] Int. Cl. ............................................ H02k 49/00
[58] Field of Search........ 74/640, 800; 310/103, 76, 310/80, 78, 82, 92, 96, 105, 106, 107, 108

[56] References Cited
UNITED STATES PATENTS

| | | | |
|---|---|---|---|
| 2,849,897 | 9/1958 | Walma........................... | 74/640 UX |
| 3,187,605 | 6/1965 | Stiff...................................... | 74/640 |
| 3,363,484 | 1/1968 | Slaughter........................ | 74/640 X |
| 3,501,978 | 3/1970 | Ferrell ................................. | 74/640 |
| 3,532,005 | 10/1970 | Bremner, Jr. et al................ | 74/640 |
| 2,444,797 | 7/1948 | Williams ............................. | 310/103 |
| 2,460,015 | 1/1949 | Jones .................................. | 310/103 |
| 3,488,535 | 11/1970 | Baermann...................... | 310/105 X |

Primary Examiner—R. Skudy
Attorney, Agent, or Firm—Michael S. Striker

[57] ABSTRACT

A magnetic type transmission wherein a first shaft drives a coaxial second shaft at a greatly reduced speed through the intermediary of a flexible disk which is secured to the second shaft and has at one of its sides an annular surface located opposite the conical surface of a rigid conical frustum. The maximum diameter of the conical surface is less that the outer diameter of the annular surface in undeformed condition of the disk. Successive increments of the annular surface are caused to contact and to travel along the conical surface (whereby the disk rotates with the second shaft relative to the rigid frustum and the first shaft) in response to travel of at least one roller along the other side of the disk opposite the annular surface. The roller is mounted on and orbits about the axis of the first shaft. Alternatively, the conical frustum can attract the annular surface toward its conical surface; the roller is then replaced with one or more magnets which are driven by the first shaft and attract the adjacent portions of the disk so that at least one series of successive increments of the annular surface again travel along the conical surface and the disk rotates with the second shaft at a speed which is a function of the difference between the circumferential lengths of the annular and conical surfaces and the vertex angle of the conical surface.

15 Claims, 10 Drawing Figures

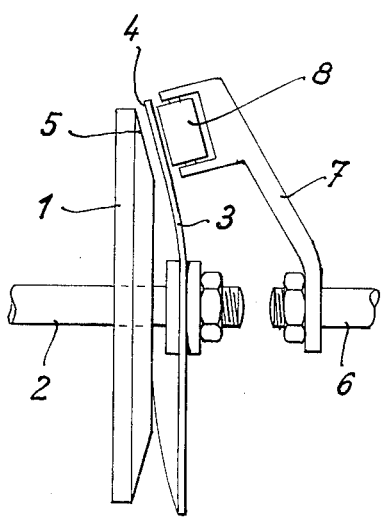
Fig. 1
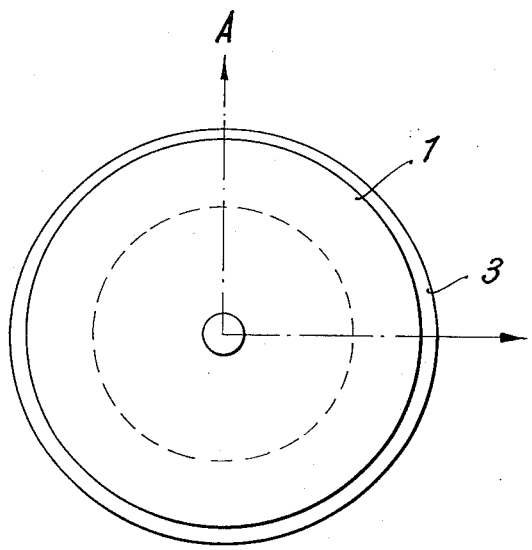
Fig. 2
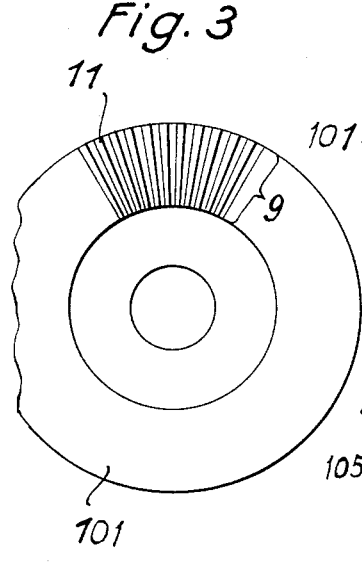
Fig. 3
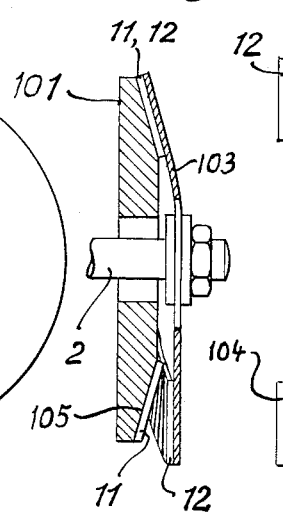
Fig. 4
Fig. 4a
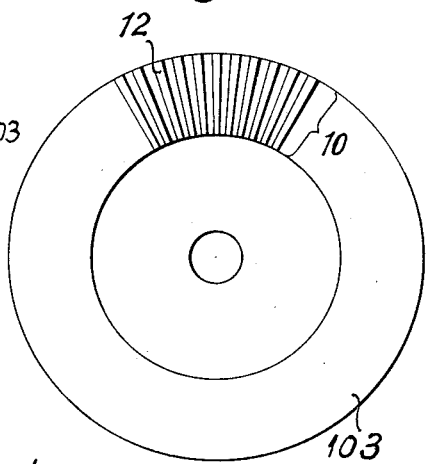
Fig. 5

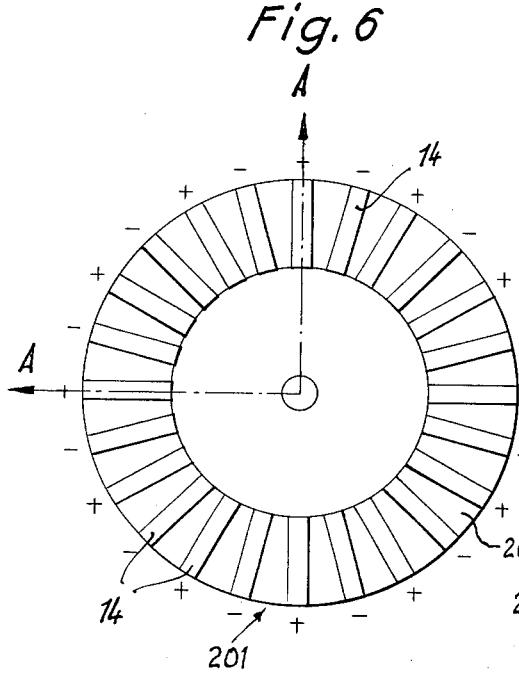
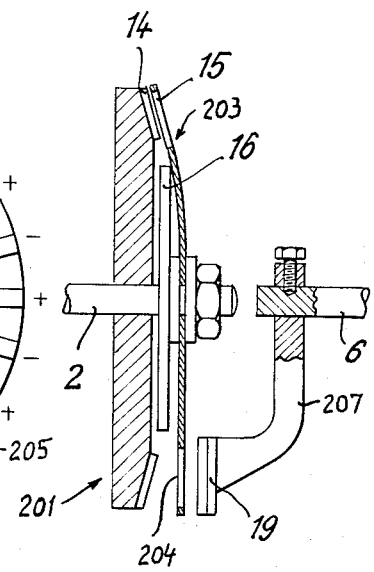
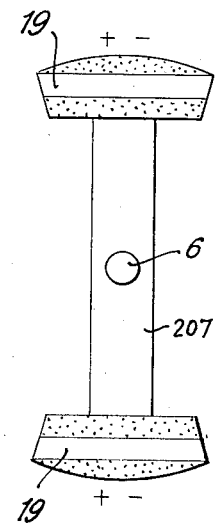
Fig. 6   Fig. 7   Fig. 8
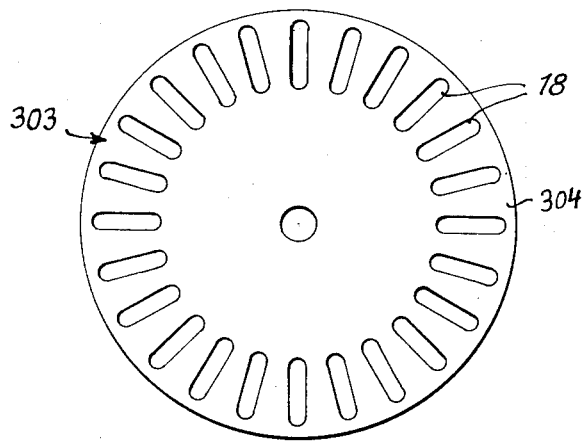
Fig. 9

MAGNETIC TYPE TRANSMISSION ARRANGEMENT

BACKGROUND OF THE INVENTION

The present invention relates to transmissions in general, and more particularly to improvements in magnetic type transmissions with high speed-reduction ratios. Still more particularly, the invention relates to improvements in transmissions of the type wherein a component part of the transmission undergoes deformation during transmission of torque from a rotary driving element to a rotary driven element, preferably from a driving shaft to a coaxial driven shaft.

It is already known to provide a transmission with a rigid stationary gear and with a deformable gear which is moved into localized contact or contacts with the stationary gear by a part which rotates with the driving element whereby the deformable gear rotates the driven element. The two gears have a common axis and the stationary gear is an internal gear having an annulus of internal teeth. The deformable gear comprises a hollow cylinder which carries an annulus of external teeth and can be flexed radially outwardly to move successive teeth of its annulus into mesh with the internal teeth of the rigid gear. The material of the hollow cylinder is normally a readily flexible sheet metal and this cylinder extends into the interior of the rigid gear. The number of internal teeth on the rigid gear exceeds the number of external teeth on the cylinder by $m$ wherein $m$ is a whole number including one. The transmission further comprises a so-called pressure wave generator which is secured to the driving element and flexes successive increments of the cylinder radially outwardly into mesh with the adjacent portion of the rigid gear. The deformable gear further comprises a rigid end wall at one axial end of the cylinder so that the deformable gear resembles a cup-shaped body the central portion of which is connected with the driven element. The axial length of the deformable cylinder at least approximates the diameter of the end wall so that the overall axial length of the transmission is quite substantial which renders it useless for many applications. A deformable cylinder of considerable axial length is necessary because a short cylinder would rapidly undergo permanent plastic deformation due to excessive expansion of its material. Also, the material of a short deformable cylinder would tire after a relatively short period of use so that the gear including the deformable cylinder would have to be replaced at frequent intervals. Since the annulus of internal teeth on the rigid gear forms a sleeve around the deformable cylinder, the flexing of successive increments of this cylinder invariably takes place radially outwardly so that a practically continuous expansion of the cylinder is unavoidable even if its axial length equals or even exceeds the diameter of the rigid end wall. Such lengthening of the deformable cylinder merely maintains the expansion of its material within tolerable limits. Of course, the versatility of the transmission decreases with increasing axial length so that such transmissions failed to gain widespread acceptance in various industries.

It is also known to provide the just described type of transmission with a deformable member whose configuration is much more complex (even though it still resembles a cup). The purpose of such complex configuration is to eliminate or at least reduce the effects of an outward flexing or expansion or wedge-like displacement which prevents proper engagement of internal teeth in the rigid gear with external teeth of the deformable gear. However, the axial length of the transmissions using such complex deformable members at least equals the axial length of previously discussed conventional transmissions and their manufacturing cost is even higher. Furthermore, even such complex deformable gears are likely to undergo permanent expansion after relatively short periods of use.

SUMMARY OF THE INVENTION

An object of the invention is to provide a novel and improved magnetic type transmission or gearing wherein the transmission of torque between a rotary driving element (e.g., the output shaft of a motor) and a preferably coaxial driven element (e.g., a second shaft) takes place by way of a deformable member which rolls along a stationary member, or vice versa, and whose axial length is but a fraction of the axial length of heretofore known transmissions.

Another object of the invention is to provide a transmission, especially a transmission with a high speed-reduction ratio, wherein the deformable torque transmitting member need not undergo any area expansion and is therefore much more capable of standing long periods of use than a cylindrical or cup-shaped deformable member.

A further object of the invention is to provide the transmission with novel and improved deforming means for effecting localized flexing of the deformable member in response to rotation of the driving element.

An additional object of the invention is to provide a transmission wherein the deformable member is provided with an annulus of mechanical or other teeth which can be moved into accurate mesh with complementary teeth of a rigid member even after prolonged use of the transmission.

Still another object of the invention is to provide a transmission which can transmit relatively high or relatively low torque and which is suitable for transmission of torque to driven parts in areas which are or should not be accessible to attendants.

A further object of the invention is to provide a transmission whose speed-reduction ratio can be selected and maintained with a high degree of accuracy, which capable of rotating a driven element at a speed which is a very small fraction of the speed of the driving element, and which comprises a small number of relatively simple, rugged and compact parts.

Another object of the invention is to provide a transmission whose efficiency is higher than that of presently known transmissions of the same general character and which can be readily designed to occupy space that is available in a plant or in any other institution where it is necessary to transmit energy between rapidly and slowly rotating elements.

The invention is embodied in a transmission, particularly in a transmission with a high speed-reduction ratio. The transmission comprises three basic components, namely, a first rotary element (e.g., a driver shaft which can receive torque from an electric motor or another suitable prime mover), a second rotary element (which is preferably coaxial with the first element and may constitute a second shaft which is to rotate at a speed substantially less than that of the first element), and novel and improved rotating or torque transmitting means for driving the second element in response to rotation of the first element.

The rotating means comprises three main parts, namely, a rigid first member having a conical surface whose center is located on the axis of the second element, a deformable disk-shaped second member one side of which faces the conical surface and is provided with an annular surface whose outer diameter in undeformed condition of the second member exceeds the maximum diameter of the conical surface on the rigid first member, and deforming or operating means which is arranged to rotate with the first element along the other side of the second member opposite the annular surface. One of the two members (preferably the second member) is secured to and serves to rotate the second element. The second member has portions, including increments of the annular surface, which are flexible between first positions in which the respective increments of the annular surface at the one side of the second member are at least closely adjacent to or actually engage with the nearest increments of the conical surface and second positions in which the respective increments of the annular surface are remote from the conical surface. In such second positions, the portions of the second member are preferably located in a plane which is normal to the axis of the second element. The portions of the second member tend to assume one of the first and second positions, and the deforming means serves to maintain the adjacent portions of the second member in the other of the first and second positions whereby at least one series of successive increments of the annular surface at the one side of the second member travel along the conical surface of the first member and the one member rotates with the second element in response to rotation of the deforming means with the first element.

The deforming means may comprise one or more rollers or analogous deforming elements which are designed to mechanically press sucessive increments of the annular surface against the conical surface when the roller or rollers are caused to orbit about the axis of the first element. Alternatively, the first member may be designed to attract the second member, preferably by magnetic force; the deforming means then includes one or more magnets which are capable of keeping the adjacent portions of the second member in the second positions whereby those increments of the annular surface which are provided on the magnetically attracted portions of the second member travel along the conical surface to set the second element in rotary motion.

The novel features which are considered as characteristic of the invention are set forth in particular in the appended claims. The improved transmission itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary schematic partly elevational and partly sectional view of a transmission which embodies one form of the invention and wherein the disk-shaped second member is movable into bodily contact with the first member;

FIG. 2 is an end elevational view as seen from the left-hand side of FIG. 1;

FIG. 3 is an end elevational view of a first member forming part of a second transmission;

FIG. 4 is a fragmentary axial sectional view of the transmission which embodies the member of FIG. 3;

FIG. 4a is a side elevational view of the disk-shaped second member in the transmission of FIG. 4, the second member being shown in undeformed condition;

FIG. 5 is an end elevational view of the disk-shaped second member shown in FIG. 4a;

FIG. 6 is a fragmentary end elevational view of a first member which forms part of a third transmission;

FIG. 7 is a fragmentary partly elevational and partly axial sectional view of the transmission which embodies the member of FIG. 6;

FIG. 8 is a front elevational view of the deforming or operating means and first element in the transmission of FIG. 7; and FIG. 9 is an end elevational view of a modified disk-shaped member which can be used in the transmission of FIG. 7.

DESCRIPTION OF THE PREFERRED EMBODIMENTS

Referring first to FIGS. 1 and 2, there is shown a portion of a transmission which comprises a first rotary element constituting a driver shaft 6, a second rotary element constituting a driven shaft 2 which is shown as being coaxial with the driver shaft 6, a first transmission member here shown as a fixedly mounted rigid frustoconical wheel 1 which is coaxial with the shaft 2, 6 and has an annular conical surface 5 making with the common axis of the shafts 2, 6 an acute angle which is preferably much closer to 90° than to 0°, a second transmission member which constitutes a flexible disk 3 secured to and serving to rotate the driven shaft 2, a lever or an analogous carrier 7 which is secured to the driver shaft 6, and a deforming element here shown as a roller 8 having an axis of rotation which is parallel to a line extending radially of the shaft 2 and contacting the conical surface 5 of the frustoconical wheel 1. The left-hand side of the flexible disk 3, as viewed in FIG. 1, has an annular surface 4 which can be pressed against the conical surface 5 of the wheel 1 in response to axial movement of the driver shaft 6 and its carrier 7 toward the driven shaft 2 and/or in response to axial movement of the driven shaft 2, disk 3 and wheel 1 toward the driver shaft 6.

It is assumed that the surfaces 4 and 5 are provided on a friction generating material such as is customarily used for the making of or on friction linings of clutches, brake shoes or the like. For example, the disk 3 and the wheel 1 may be provided with thin layers or coats consisting of a material having a high coefficient of friction.

The carrier 7 extends substantially radially of the driver shaft 6 and defines an axis of rotation for the roller 8 which latter is an idler roller. As mentioned above, the axis of the roller 8 is parallel to a line which extends radially of the shaft 2 and touches the conical surface 5 of the wheel 1. Otherwise stated, the inclination of the axis of the roller 8 relative to the axis of the shaft 2 is the same as the taper of the surface 5 or one-half the vertex angle of the surface 5. If desired, the illustrated one-armed carrier 7 can be replaced with a two-armed carrier which supports two idler rollers 8 or analogous deforming elements located diametrically opposite each other with reference to the axis of the driver shaft 6. In its unstressed or undeformed condition, the disk 3 is located in a plane making a right angle with the axis of the driven shaft 2. In the position which is shown in FIG. 1, the roller 8 deflects the adjacent portion of the disk 3 and the respective increment of the annular surface 4 toward and into engagement with the conical surface 5 whereby, when the roller 8 is caused to orbit about the axis of the shaft 6. The series of increments of contact between the disk 3 and wheel 1 travel along the surface 5 and the disk 3 rotates the driven shaft 2 at a speed which is a small fraction of the speed of the driver shaft 6. As shown in FIG. 2, the diameter of the disk 3 (in unstressed or undeformed condition thereof) exceeds the diameter of the frustoconical wheel 1 and the inner and outer diameters of the annular surface 4 on the disk 3 (in undeformed condition of the disk) then exceed the maximum and minimum diameters of the conical surface 5 on the wheel and minimum When the transmission is in use, the shaft 6 is driven by a motor or the like, not shown, it causes the roller 8 to orbit about the common axis of the shafts 2 and 6. If the roller 8 is held in the position of FIG. 1, it engages and flexes the respective side of the disk 3 opposite the annular surface 4 so that successive increments of the surface 4 "roll" along successive increments of the conical surface 5. The provision of aforementioned friction generating material or materials reduces the likelihood of slippage between the members 3 and 1. Since the annular surface 4 is longer than the conical surface 5, as considered in the circumferential direction of the disk 4 and wheel 1, and in undeformed condition of the disk, the rolling of the entire surface 5 requires more than one revolution of the shaft 6, i.e., that portion of the annular surface 4 which represents the difference between the circumferential lengths of the surfaces 4 and 5 will be rolled along the surface 5 during the next-following revolution of the shaft 6 and the ratio of the speed of shaft 6 to the speed of shaft 2 depends on the difference between the circumferential lengths of the surfaces 4 and 5. The shaft 2 is rotated in the same direction as the shaft 6.

Contrary to the showing of FIG. 2, the disk 3 is preferably of perfectly circular shape. The elliptical shape shown in FIG. 2 is due to the fact that the disk 3 of FIG. 2 is assumed to be pressed against the conical surface 5 at two locations which are disposed diametrically opposite each other, i.e., the shaft 6 is assumed to drive a carrier with two rollers 8 or analogous deforming elements. It is to be noted that the upper half of FIG. 1 shows the disk 3 in a section taken along the lines A—A of FIG. 2.

If the surfaces 4 and 5 are provided on layers or bodies consisting of a material having a high coefficient of friction, the improved transmission simultaneously functions as a friction clutch which allows the shaft 2 to rotate at a speed which is less than the speed-reduction ratio of the transmission or to remain at a standstill if the shaft 2 or the parts connected therewith offer an excessive resistance to rotation in response to rolling of the annular surface 4 along the stationary conical surface 5. The efficiency of the transmission is improved if the carrier 7 supports two rollers 8, i.e., such construction reduces the likelihood of slippage between the surfaces 4 and 5 even if the shaft 6 is to transmit to the shaft 2 a high torque. The two rollers must be mounted exactly diametrically opposite each other. A single roller 8 will suffice if the torques to be transmitted are relatively low; this reduces the initial cost of the transmission.

The transmission of FIG. 1 can be modified by using a stationary disk 3 and a frustoconical wheel 1 which is secured to the output shaft 2. The operation is the same excepting that the shafts 2 and 6 then rotate in opposite directions. In each instance, the material of the wheel 1 is rigid or substantially rigid and the disk 3 consists of flexible material. It is desirable to select the taper of the conical surface 5 in such a way that the disk 3 can move its surface 4 into contact with the wheel 1 in response to relatively small deflection by one or more rollers 8. This insures that the deformation of the disk 3 does not result in any appreciable expansion or enlargement of its area. As explained above, when the roller 8 of FIG. 1 causes the disk 3 to bear against the wheel 1, the annular surface 4 is "developed" onto the smaller surface 5 but such developing requires more than one revolution of the driver shaft 6. The disk 3 rotates relative to the stationary wheel 1 through an angle which is a function of the difference between the lengths of the surfaces 4 and 5. In other words, the shaft 6 must rotate through more than 360° in order to change the angular position of the shaft 2 through a fraction of a single revolution, such fraction being a function of the difference between the lengths of the surfaces 4 and 5. In speaking of circumferential length of the surface 4, it is intended to denote the length of the surface 4 in undeformed condition of the disk 3. The difference in lengths of the surfaces 4, 5 is proportional to the difference between the outer diameter of the surface 4 (in undeformed condition of the disk 3) and the maximum diameter of the conical surface 5.

FIGS. 3, 4, 4a and 5 illustrate a portion of a second transmission. This transmission comprises a rigid stationary wheel 101 having a conical surface 105 whose taper is similar to that of the conical surface 5 and which is provided with radially extending equidistant teeth or ribs 11. The disk 103 is shown in deformed condition in FIG. 4, and in undeformed condition in FIG. 4a. As shown, the annular surface 104 of this disk is provided with teeth or ribs 12 whose number exceeds the number of teeth 11 by $m$ wherein $m$ is one or a whole multiple of one. The difference $m$ between the numbers of teeth 11 and 12 is a function of the difference between the lengths of the surfaces 104 and 105. The teeth 11 and 12 respectively form two circumferentially complete annuli 9 and 10. When the disk 103 is allowed to assume the undeformed condition of FIG. 4a, its teeth 12 extend radially of the axis of the driven shaft 2 and are equidistant from each other. The teeth 11 extend radially of the axis of the wheel 101. When a roller (not shown in FIG. 4) or an analogous deforming element flexes the adjacent portion of the disk 103, successive teeth 12 of the thus deformed disk mate with the adjacent teeth 11 to thus positively prevent slippage of the disk 104 so that the speed of the driven shaft 2 corresponds exactly to the nominal speed-reduction ratio of the transmission. The difference $m$ between the number of teeth 12 on the surface 104 and the number $n$ of teeth 11 on the conical surface 105 is also a function of the spacing or pitch of such teeth on the wheel 101. The difference $m$ can be changed by changing the taper of the conical surface 105.

As illustrated in FIGS. 6 to 8, the mechanical slippage preventing teeth 11 and 12 can be replaced by suitable magnets which can transmit torque from the driver shaft 6 to the driven shaft 2 in response to localized flexing of the disk 203. The rigid stationary frustoconical wheel is shown at 201 and its conical surface at 205. The driver shaft 6 carries one (FIG. 7) or two (FIG. 8) deforming elements 19. The conical surface 205 is provided with equidistant alternately positive and negative poles 14 (see particularly FIG. 6) and the annular surface 204 of the flexible disk 203 is provided with alternating positive and negative magnetic poles 15. These poles can be termed magnetic teeth. The magnetic teeth 15 extend radially of the disk 203 when the latter is caused to assume its undeformed condition. The number of magnetic teeth 15 exceeds the number of magnetic teeth 14 by $m$ wherein $m$ is a whole number including one. Thus, the number of teeth 15 is $m + n$ wherein $n$ is the number of teeth 14.

The driven shaft 2 carries a ring-shaped distancing member 16 which limits the extent of flexing of the disk 203 when the transmission is in use and the disk 203 rotates in response to rotation of the driver shaft 6. The distancing member 16 further prevents the flexing of disk 203 into bodily contact of magnetic teeth 14 with the teeth 15 in the regions where the disk 203 is being deformed in a manner as illustrated in the upper portion of FIG. 7. However, the extent to which the disk 203 is being flexed toward the conical surface 205 suffices to establish a magnetic torque transmitting connection so that the shaft 2 rotates at a speed which is less than the speed of the shaft 6. The upper part of FIG. 7 shows that the deformed portion of the disk 203 bears against the distancing member 16 and is thereby maintained at a desired distance from magnetic teeth 14 on the conical surface 205 of the stationary wheel 201. This insures that the relatively movable members 201, 203, are free of Coulombian friction. Otherwise, the principle of operation is the same as described in connection with FIGS. 1 and 2, i.e., successively deformed portions of the annular surface 204 "roll" along the stationary conical surface 205 whereby the disk 203 turns relative to the wheel 201 due to the difference between the lengths of the surfaces 204 and 205. The deforming elements 19 are magnets which are located diametrically opposite each other with respect to the axis of the driver shaft 6 and can straighten out successive portions of the disk 203 in response to rotation of the shaft 6.

FIG. 9 illustrates a further disk 303 wherein the magnetic teeth 15 are omitted. Instead, the disk 303 is formed with radial slots 18 (which are provided in the annular surface 304) and consists of magnetically soft material. Such disk can be used with the wheel 201 of FIGS. 6 and 7, and the number of its slots 18 corresponds to the number of teeth 15 on the disk 203, i.e., it exceeds the number of teeth 14 by $m$ wherein $m$ is a whole number including one. The disk 303 is used in the same way as the disk 203, namely, the transmission again comprises a distancing member 16 (shown in FIG. 7) to insure that the deflected increments of the annular surface 304 on the disk 303 do not come into bodily contact with the teeth 14 of the wheel 201. As explained in connection with FIGS. 6 and 7, the distancing member 16 prevents the generation of Coulombian friction.

In the embodiments of FIGS. 6-7 and 9, the flexing or deformation of the disk 203 or 303 takes place by the action of magnetic forces which are generated by magnetic teeth. In order to insure that the disk 203 or 303 will roll along the surface 205 of the wheel 201, i.e., to insure mere localized flexing of the disk 203 or 303, the transmission which includes the structure of FIGS. 6-7 or the disk of FIG. 9 further comprises the aforementioned deforming elements of magnets 19 which are mounted on the carrier 207 of the driver shaft 6 and rotate relative to the disk 203 or 303. The magnets 19 attract the disk 203 or 303 at those points which should not change their positions during localized flexing of the disk. Such points are angularly offset by 90° relative to the flexed portions of the disk 203 or 303. In other words, the two flexed portions of the disk 203 or 303 (it being assumed that the carrier 207 is provided with two magnets 19 as shown in FIG. 8) alternate with the portions which are attracted by the magnets 19 whereby the annular surface 204 or 304 of the disk 203 or 303 rolls along the conical surface 205 of the wheel 201 in the same way as described in connection with FIGS. 1 and 2. The disk rotates without any Coulombian friction. Generally speaking, the transmission of FIGS. 6-7 or the transmisssion using the disk 303 of FIG. 9 also effects a localized flexing of the respective disk toward the wheel 201, but such flexing is effected by magnetic force rather than by mechanical means. The magnetic teeth 14 of the wheel 201 tend to attract the entire annular surface 204 or 304 but the magnets 19 counteract such tendency of magnetic teeth 14 by maintaining the adjacent portions of the disk 203 or 303 in undeformed condition whereby the flexed portions of the disk 203 or 303 travel along the conical surface 205 and initiate the rotation of disk 203 or 303 and driven shaft 2.

If desired, the disk 303 of FIG. 9 may be made of non-magnetic material and its annular surface is then provided with inserts consisting of magnetically soft pulverulent material. This reduces losses due to eddy currents to further enhance the efficiency of the transmission.

In contrast to the roller or rollers 8 which produce a flexing or deforming action toward the wheel 1 or 101, the magnets 19 of FIG. 8 perform an attracting or negative deflecting action in a direction away from the wheel 201. Thus, whereas the action of rollers or the like upon the disk is a positive action, the action of magnets 19 is negative in that the magnets tend to move the adjacent portions of the disk 203 or 303 away from the conical surface 205. It is also within the purview of the invention to operate the transmission of FIGS. 6-7 or the transmision including the disk 303 of FIG. 9 by resorting to a driver shaft which carries a different number of magnets 19, for example, a single magnet or more than two magnets.

In each embodiment of the invention, the speed-reduction ratio depends on the difference between the length of the conical surface on the frustoconical wheel and the length of the annular surface on the deformable disk. Such ratio can be calculated in advance with a high degree of accuracy, and the ratio can be maintained in actual use of the transmission, especially if the surfaces of the wheel and disk are provided with friction generating means, mechanical teeth or magnetic teeth to reduce the likelihood of slippage. The transmission occupies very little room, especially as considered in the axial direction of the shafts 2 and 6, which renders it possible to use such transmission in areas which cannot accommodate other types of transmissions, for example, those which were described hereinbefore as employing a gear having a deformable portion of cylindrical or substantially cylindrical rather than discoid shape.

The improved transmission can be used with advantage in remote control mechanisms, for example, to transmit motion to parts which are confined in areas not readily accessible or dangerous to attendants. Such areas include those which contain fissionable materials or the like.

An advantage of the improved transmission over the conventional transmissions with deformable cup-shaped gears is that the deformable member 3, 103, 203, or 303 of the means for rotating the shaft 2 in response to rotation of the shaft 6 is a disk. Consequently, when the disk is flexed in response to rotation of the shaft 6 so that successive increments of the annular surface 4, 104, 204, or 304 travel along (in or out of bodily contact with) the conical surface 5, 105, or 205, the Gaussian curvature of each portion of the annular surface 4, 104, 204, or 304 is zero at all times. The annular surface (in deformed condition of the disk) is a torus. Therefore, the area of the disk is not enlarged or expanded during flexing and the disk is capable of satisfactory use for long periods of time. Also, the axial length of the improved transmission which uses a disk-shaped deformable member 3, 103, 203, or 303 is only a small fraction of the axial length of conventional transmissions which employ cupped deformable members.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A magnetic type arrangement, particularly a transmission having a high speed-reduction ratio, comprising first and second rotary elements and means for rotating said second element in response to rotation of said first element, including a rigid first member having a conical surface which includes a first annulus of alternating positive and negative magnetic poles and whose center is located on the axis of said second element, a deformable disk-shaped second member having a first side facing said conical surface and provided with an annular surface which includes a second annulus of alternating positive and negative magnetic poles and is concentric with said conical surface, said second member further having a second side and the outer diameter of said annular surface in undeformed condition of said second member exceeding the maximum diameter of said conical surface, one of said members being secured to said second element and said second member having portions including increments of said annular surface and being flexible between first positions in which the respective increments of said annular surface are at least closely adjacent to said conical surface and second positions in which the respective increments of said annular surface are remote from said conical surface, each of said portions of said second member tending to assume one of said first and second positions, and deforming means provided on said first element at the second side of said second member opposite said annular surface, said deforming means being arranged to maintain the adjacent portions of said second member in the other of said first and second positions whereby at least one series of successive increments of said annular surface travel along said conical surface with attendant rotation of said one member and said second element in response to rotation of said deforming means with said first element.

2. An arrangement as defined in claim 1, wherein said elements are coaxial shafts and the vertex angle of said conical surface exceeds 90°.

3. An arrangement as defined in claim 1, wherein said second member is secured to said second element, said deforming means being arranged to maintain said adjacent portions of said second member in said other positions without appreciable expansion of said second member.

4. An arrangement as defined in claim 3, wherein said deforming means comprises carrier means secured to said first element and at least one deforming element provided on said carrier means to orbit about the axis of said first element at said second side of said second member opposite said successive increments of said annular surface.

5. An arrangement as defined in claim 1, wherein said first and second members are provided with means for preventing slippage of said one member relative to said other member while said increments of said annular surface travel along said conical surface.

6. An arrangement as defined in claim 5, wherein said slippage preventing means includes a first annulus of teeth provided on said conical surface and a second annulus of teeth provided on said annular surface, the number of teeth forming said second annulus differing from the number of teeth forming said first annulus by $m$ wherein $m$ is a whole number including one.

7. An arrangement as defined in claim 1, wherein said deforming means comprises means for moving said successive increments of said annular surface into bodily contact with said conical surface.

8. An arrangement as defined in claim 1, wherein, the number of poles forming said second annulus exceeds the number of pole forming said first annulus by m wherein m is a whole number including one.

9. An arrangement as defined in claim 8, further comprising distancing means for maintaining said successive increments of said annular surface out of bodily contact with said conical surface but for allowing sufficiently close approximation of said increments to said conical surface to establish a magnetic connection between said increments and said conical surface.

10. An arrangement as defined in claim 1, wherein said conical surface is provided with an annulus of alternating positive and negative magnetic poles and said disk has an annulus of slots provided in said annular surface thereof, the number of said slots exceeding the number of said poles by *m* wherein *m* is a whole number including one and said second member consisting of magnetically soft material, and further comprising distancing means arranged to maintain said successive increments of said annular surface out of bodily contact with said conical surface but to allow sufficient approximation of said increments to said conical surface to establish a magnetic connection between said increments and said conical surface.

11. An arrangement as defined in claim 1, wherein said conical surface is provided with an annulus of alternating positive and negative magnetic poles and said second member consists of non-magnetic material and comprises an annulus of inserts consisting of magnetically soft pulverulent material and being provided in said annular surface, the number of said inserts exceeding the number of said poles by *m* wherein *m* is a whole number including one, and further comprising distancing means for maintaining said increments of said annular surface out of bodily contact with said conical surface while permitting sufficient approximation of said increments to said poles to establish a magnetic connection between said members in the region of said increments.

12. An arrangement as defined in claim 1, wherein said deforming means comprises at least one magnet which is arranged to maintain the adjacent portions of said second member in said second positions.

13. An arrangement as defined in claim 1, wherein the inner diameter of said annular surface in undeformed condition of said second member exceeds the minimum diameter of said conical surface.

14. An arrangement as defined in claim 1, wherein said vertex angle is closer to 180° than to 135°.

15. An arrangement as defined in claim 1, wherein said first member is a frustoconical wheel.

* * * * *